(12) United States Patent
Tallhamn et al.

(10) Patent No.: US 11,958,634 B2
(45) Date of Patent: Apr. 16, 2024

(54) OPTIMIZATION SYSTEM OF HETEROGENEOUS LOW EARTH ORBIT MULTI-USE SPACECRAFT

(71) Applicant: SPIRE GLOBAL SUBSIDIARY, INC., San Francisco, CA (US)

(72) Inventors: Marcus Tallhamn, San Francisco, CA (US); Barry King, San Francisco, CA (US)

(73) Assignee: SPIRE GLOBAL SUBSIDIARY, INC., San Francisco, CA (US)

( * ) Notice: Subject to any disclaimer, the term of this patent is extended or adjusted under 35 U.S.C. 154(b) by 642 days.

(21) Appl. No.: 17/088,912

(22) Filed: Nov. 4, 2020

(65) Prior Publication Data
US 2022/0135256 A1   May 5, 2022

(51) Int. Cl.
| | | |
|---|---|---|
| B64G 1/24 | (2006.01) | |
| B64G 1/10 | (2006.01) | |
| G01S 19/02 | (2010.01) | |
| G01S 19/06 | (2010.01) | |
| G01S 19/20 | (2010.01) | |
| G01S 19/26 | (2010.01) | |

(52) U.S. Cl.
CPC ........... B64G 1/242 (2013.01); B64G 1/1085 (2013.01); G01S 19/02 (2013.01); G01S 19/06 (2013.01); G01S 19/20 (2013.01); G01S 19/26 (2013.01)

(58) Field of Classification Search
CPC ....... B64G 1/242; B64G 1/1085; G01S 19/02; G01S 19/06; G01S 19/20; G01S 19/26; H04B 7/18521
See application file for complete search history.

(56) References Cited

U.S. PATENT DOCUMENTS

| | | | |
|---|---|---|---|
| 2014/0040282 A1* | 2/2014 | Mann | B64G 1/1085 707/736 |
| 2021/0328660 A1* | 10/2021 | Schloemer | H04B 7/18519 |

OTHER PUBLICATIONS

Search Report from related European patent application No. 21206531.2 dated Mar. 23, 2022.
Cappaert Jeroen et al: "Network Control Systems for Large-Scale Constellations" In: "Handbook of Small Satellites : Technology, Design, Manufacture, Applications, Economics and Regulation", Jan. 1, 2020 (Jan. 1, 2020), Springer International Publishing.
Cappaert Jeroen: "The Spire Small Satellite Network : Technology, Design, Manufacture, Applications, Economics and Regulation" In: "Handbook of Small Satellites : Technology, Design, Manufacture, Applications, Economics and Regulation", Jan. 1, 2020 (Jan. 1, 2020), Springer International Publishing.
Cho Doo-Hyun et al: "Optimization-Based Scheduling Method for Agile Earth-Observing Satellite Constellation", Journal of Aerospace Information Systems, vol. 15, No. 11, Nov. 1, 2018 (Nov. 1, 2018), pp. 611-626.

* cited by examiner

Primary Examiner — Afshawn M Towfighi
(74) Attorney, Agent, or Firm — Steven M. Koehler; Westman, Champlin & Kochler, P.A.

(57) ABSTRACT

A constellation planning system receives a request, from a client, to plan an optimal set of tasks for one or more satellites in a constellation of satellites and at least one ground station in a constellation of ground stations. The request includes a planning problem object. The system generates a status of the planning task describing a progress of the planning task, and returns the status to the client. If the status of a task is successful, then the client may retrieve the resulting schedule and publish it to the constellation.

22 Claims, 29 Drawing Sheets

```
# POST /api/v1/plans
# Content-Type: application/yaml
# -----------------------------------

# Solver parameters to use for this problem.
solver:
  # Priority: either "production" or "simulation". Determines the worker queue
  # used to process the request.
  priority: simulation

# The planning problem to solve.
model:
  payload_types:
    # Payload types define the properties of various payloads, and are referenced
    # by the satellite definitions in the constellation.
    # type: A unique identifier for this type of payload.
    # aois: A list of area-of-interest identifiers in which this payload should be active.
    # requirements: A list of resource requirements for this payload.
    - type: qubeais_v1
      aois:
        - global
      requirements:
        attitude: nadir
        power_mw: 1
    - type: stratos_v1
      aois:
        - landmasses
      requirements:
        attitude: nadir
        power_mw: 100 comms_types:
```

FIG. 8A

```
# Comms types define the various communications packages that satellites and
  # ground stations can be equipped with. Communications can occur between
  # satellites and ground stations, or satellites and satellites, when an access
  # exists and they both are equipped with the same comms type.
  # type: A unique identifier for this type of communications package.
  # requirements: A list of resource requirements for this payload.
  - type: uhf_radio
    requirements:
      target_tracking: False
      power_mw: 1000
  - type: laser_isl
    requirements:
      target_tracking: True
      power_mw: 500
      # exclude: Defines mutual exclusion constraints between comms packages.
      exclude:
        - laser_ground
  - type: laser_ground
    requirements:
      target_tracking: True
      power_mw: 500
      exclude:
        - laser_isl constellation:
  # Structure and capabilities of the constellation assets.
  satellites:
    # Descriptions of each satellite, including its equipped payloads and
    # communications systems.
    - id: FM123
      payloads:
        - name: QubeAIS
          type: qubeais
      comms:
        - name: UHF Radio
          type: uhf_radio
```

FIG. 8B

```
        # can_receive: Defines if the satellite can receive data using this
        # comms package.
        can_receive: True
        # can_transmit: Defines if the satellite can transmit data using this
        # comms package.
        can_transmit: True
      - name: ISL Link
        type: laser_isl
        can_receive: True
        can_transmit: True
    storage:
      capacity_mb: 1024 ground_stations:
  # Descriptions of each ground station, including its equipped payloads and
  # communications systems.
  - id: exgs
    comms:
      - name: UHF Radio
        type: uhf_radio
        # can_receive: Defines if the satellite can receive data using this
        # comms package. Used to enforce regulatory requirements on spectrum
        # use.
        can_receive: True
        # can_transmit: Defines if the satellite can transmit data using this
        # comms package. Used to enforce regulatory requirements on spectrum
        # use.
        can_transmit: True
      - name: Laser Receiver
        type: laser_ground
        can_receive: True
        can_transmit: True
```

FIG. 8C

```
initial_state:
  # The initial state of the system, assumed to hold at the start of the
  # planning interval.

schedule:
  # An activity is a period of time during which the system state changes or
  # a change in system constraints occurs. The schedule is a list of
  # activities which are taken as given by the planning system.
  activities:
    # id: Unique identifier for this activity.
    # label: Short, human readable text describing this activity.
    # timing: A list of timing constraints defining when this activity
    # occurs.
    - id: top
      label: Planning Period
      timing:
        # rel: A temporal relationship within the Allen interval algebra.
        # Possible values include before, after, meets-before, meets-after,
        # overlaps-start, overlaps-end, starts, ends, during, equals. See
        # Appendix B for descriptions.
        # id: The ID of the other activity in the relation.
        # interval: Specify an anonymous interval at a fixed time as the
        # other activity.
        - rel: equals
          interval: [0, 8640]
    - id: C20D8EFE-A7A2-449D-808D-EDC9A1A7B541
      label: Access exgs <-> FM123
      timing:
        - rel: during
          id: top
        - rel: equals
          interval: [0, 900]
      assertions:
        # Assertions define changes in state or constraints during the
        # activity. For now we will only support assertions of facts - atomic
        # predicates and values - but in the future this API may expand to
        # include continuous values and user-defined constraints between
        # variables.
```

FIG. 8D

```
before:
  # Assertions which must hold at the start event of this activity.
during:
  # Assertions which must hold while this activity is active.
  - type: fact
    fact: access_exgs_fm123
    val: true
  - type: fact
    fact: access_fm123_exgs
    val: true
  - type: fact
    fact: link_quality_fm123_exgs
    val: 0.85
  - type: fact
    fact: link_quality_exgs_fm123
    val: 0.85
after:
  # Assertions which must hold at the end event of this activity.
  - type: fact
    fact: access_exgs_fm123
    val: false
  - type: fact
    fact: access_fm123_exgs
    val: false
- id: 70C762EA-D7E5-40A8-B7F7-8CDCECF5F4D5
  label: STRATOS payload window FM123
  timing:
    - rel: during
      id: top
    - rel: equals
      interval: [200, 3000]
  assertions:
    before:
    during:
      - type: fact
        fact: payload_fm123_stratos_data_rate
        val: 0.632
    after:
```

FIG. 8E

```
        # Assertions which must hold at the end event of this activity.
        - type: fact
          fact: access_exgs_fm123
          val: false
        - type: fact
          fact: access_fm123_exgs
          val: false

TBD Representation of payload scheduling constraints and goals.

goals:
  # Defines the objective function used to optimize the result.
  # To start, we will only support the "maximize_value" objective.
  - maximize_value
```

FIG. 8F

```
# 200 OK
# Content-Type: application/yaml
--------------------------------- status: success
metadata:
  created: 2020-02-18T15:48:13+00:00
  planning_time_s: 103
metrics:
  plan_value: 9235
  max_plan_value: 12500
  mip_gap: 0.0024269592277843433
  # Additional metrics to consider: payload data latency percentiles; total data
  # downloaded; percentage of contacts selected.
result:
  # The result is a grounded schedule, that is, one where all of the timing
  # constraints are explicit.
  schedule:
    activities:
      # Activities in the schedule which were added by the Optimizer. In this
      # case, a contact was created from an access that was present in the input
      # problem. These activities should be joined with the input to get the
```

FIG. 9A

```
# full schedule.
  - id: 298609EA-1DC3-4D4F-8B06-2DAB8CF85ECF
    label: UHF BIDIR contact exgs <-> FM123
    timing:
      # Here we have a relationship between the parent interval and this
      # child interval: the contact must occur during the access. The
      # optimizer will ensure that these constraints are mutually satisfied
      # by the schedule, and that there are no conflicts.
      - rel: during
        id: C20D8EFE-A7A2-449D-808D-EDC9A1A7B541
      - rel: equals
        interval: [0, 900]
    assertions:
      before:
      during:
        # The contact is symmetric/bidirectional, so there are two facts
        # here: FM123 has a link with EXGS, and EXGS has a link with FM123.
        - type: fact
          fact: contact_exgs_fm123
          val: true
        - type: fact
          fact: contact_fm123_exgs
          val: true
        # TBD: In the output schedule the set of facts that are true at any
        # given point in time is determined by the activities that are
        # active at that time. Should we denormalize the facts from parent
        # activities down to their children? This may be best done as a
        # library on the client side.
      after:
  - ...
```

FIG. 9B

```
# 200 OK
# Content-Type: application/yaml
------------------------------ status: error
metadata:
  created: 2020-02-18T15:48:13+00:00
  planning_time_s: 103
error:
  type: ERR_INFEASIBLE_MODEL
  description: The model was infeasible; no solutions exist.
```

FIG. 10

*Indices and sets:*

| | |
|---|---|
| $t \in T$ | set of all transits |
| $t_{bd} \in T_{bd} \subseteq T$ | set of all BIDIR transits |
| $(t_{rxo}, t'_{rxo}) \in T_{rxo} \subseteq T$ | set of all RXO transit pairs, where $t'_{rxo}$ occurs after $t_{rxo}$ |
| $t_{ex} \in \bar{T} \subset T$ | set of transits that are excluded due to payload windows |
| $v \in V_t$ | set of all overlapping transits with transit $t$ |
| $w \in W_{t_{rxo}, t'_{rxo}}$ | set of all BIDIR transits the exists between transit $t_{rxo}$ and $t'_{rxo}$ |
| $i \in I$ | set of all spire ids |
| $\bar{t} \in T_i \subseteq T$ | set of all transits $\bar{t}$ for spire id $i$ |
| $h \in H_i$ | set of payload chunks of payload data available for transit $i$ |
| $\bar{h} \in \bar{H}_i$ | set of operator chunks for spire id $i$ |
| $g \in G$ | set of all payload goals |
| $\bar{g} \in \bar{G} \subseteq G$ | set of all operator goals |
| $\hat{h} \in H_g \subseteq H$ | set of data chunks associated with goal $g$ |

*Data:*

| | |
|---|---|
| $dur_t$ | duration of transit $t$ |
| $rate_t$ | download rate for transit $t$ |
| $mbc$ | minimum number of BIDIR contacts per spire id that can be scheduled |
| $mtb$ | maximum time between BIDIR contacts for each spire id |
| $lat_{ht}$ | latency of data chunk $h$ is downloaded on transit $t$ |
| $pts_g$ | maximum point value for goal $g$ |
| $lat_{ght}$ | 1 if downloading chunk $h$ in transit $t$ meets the require latency for goal $g$ |
| $mkb_g$ | maximum kilobytes available for goal $g$ |

*Decision variables:*

| | |
|---|---|
| $X_t$ | 1 if transit $t$ is active; otherwise 0 |
| $\hat{X}_t$ | 1 if transit $t$ is scheduled by an operator; 0 otherwise |
| $Z_t$ | volume of data that can be downloaded on transit $t$ |
| $\hat{Z}_{hi}$ | fraction of data chunk $h$ downloaded during transit $t$ |
| $\bar{C}_h$ | 1 if chunk $h$ is active on any transit |
| $Y_g$ | progress for goal $g$ |

FIG. 13A $$(\text{CONTACT}) \max pts_g Y_g \qquad (1)$$

$$\hat{X}_{t_{rxo}} \leq 0 \quad \forall t_{rxo} \in T_{rxo} \qquad (2)$$

$$X_t \geq \hat{X}_t \quad \forall t \in T \qquad (3)$$

$$dur_t * rate_t (X_t - \hat{X}_t) \leq Z_t \quad \forall t \in T \qquad (4)$$

$$\sum_{v \in V_t} X_v \leq 1 \quad \forall t \in T \qquad (5)$$

$$\sum_{\bar{t} \in T_{\bar{i}}} X_{\bar{t}} \geq mbc \quad \forall i \in I, \bar{t} \in T_i \cap T_{bd} \qquad (6)$$

$$X_{t_{rxo}} + X_{t'_{rxo}} - 1 \leq \sum_{w \in W_{t_{rxo}, t'_{rxo}}} X_w \quad \forall (t_{rxo}, t'_{rxo}) \in T_{rxo} \qquad (7)$$

$$\sum_{\bar{t} \in T_{\bar{i}}} \hat{Z}_{h\bar{t}} \leq 1 \quad \forall h \in H, i \in I \qquad (8)$$

$$\bar{Z}_h = \sum_{\bar{t} \in T_{\bar{i}}} \hat{Z}_{h\bar{t}} \quad \forall h \in H, i \in I \qquad (9)$$

$$\sum_{h \in H_i} \hat{Z}_{h\bar{t}} = Z_{\bar{t}} \quad \forall i \in I, \bar{t} \in T_i \qquad (10)$$

$$\sum_{\bar{h} \in \bar{H}_i} \hat{Z}_{\bar{h}\bar{t}} = \hat{X}_{\bar{t}} \quad \forall i \in I, \bar{t} \in T_i \qquad (11)$$

$$\sum_{\bar{h} \in \bar{H}_i} \sum_{\bar{t} \in \bar{T}_i} \hat{Z}_{\bar{h}\bar{t}} = \sum_{\bar{t} \in T_i} \hat{X}_{\bar{t}} \quad \forall i \in I \qquad (12)$$

$$\sum_{\bar{h} \in \bar{H}_i} \hat{Z}_{\bar{h}\bar{t}} \leq 1 \quad \forall i \in I, \bar{t} \in T_i \qquad (13)$$

$$X_{t_{cx}} = 0 \quad \forall t_{cx} \in T_{cx} \qquad (14)$$

$$\sum_{\bar{h} \in H} \sum_{\bar{t} \in T_i} \sum_{i \in I} lat_{g\bar{h}\bar{t}} \, dur_{\bar{t}} \, rate_{\bar{t}} \, \hat{Z}_{\bar{h}\bar{t}} \geq mks_g S_g \quad \forall g \in G \ni \bar{G} \qquad (15)$$

$$\sum_{\bar{h} \in H_i} \sum_{\bar{t} \in T_i} \sum_{i \in I} \hat{Z}_{\bar{h}\bar{t}} \geq \sum_{i \in I} |\bar{H}_i| S_g \quad \forall \bar{g} \in \bar{G}, i \in I \qquad (16)$$

(1) Maximizes the number of points
(2) All of the operator contacts must not be RXO
(3) Forces all active indicators to be greater the operator indicators
(4) Forces the amount of data to be less than the possible amount of data downloaded in a transit. Unless the transit is used by an operator. Then the amount of data downloaded is zero.
(5) Only one transit of each overlapping transit set may occur.
(6) The number of BIDIR transits for each satellite is greater than the required number of BIDIR transits

FIG. 13B (7) Forces a BIDIR contact to occur between two RXO contacts for a given satellite
(8) Each data chunk can only be downloaded once for each satellite
(9) Sets the chunk indicator to one if the chunk is downloaded during a transit
(10) The sum of the downloaded data is equal to the data capacity of the transit
(11) One chunk of operator data must be downloaded for each operator transit
(12) All of the operator data chunks must be downloaded
(13) Only one chunk of operator data can be downloaded per transit
(14) Transits that are scheduled during payload collections for certain satellites are excluded
(15) Forces the progress to be less than the ratio of chunks of kilobytes scheduled compared to maximum number of kilobytes
(16) Counts the number of transits towards the operator progress goal

FIG. 13C

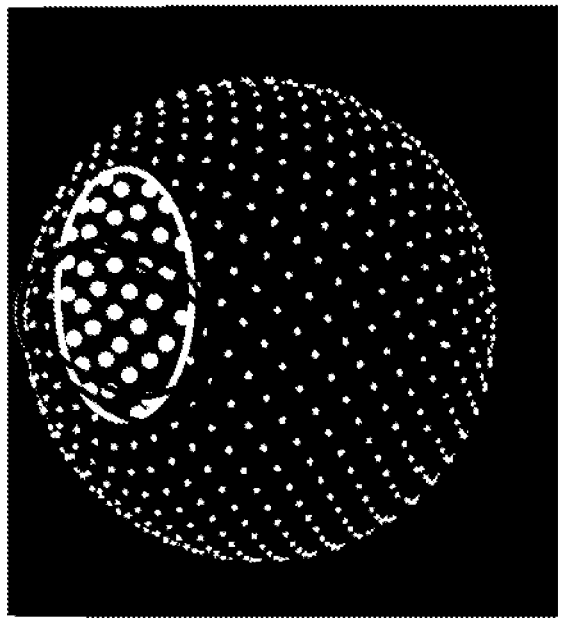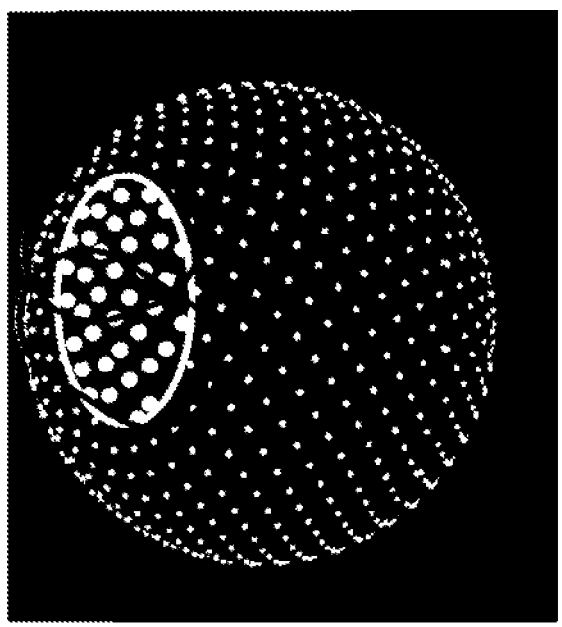
FIG. 17

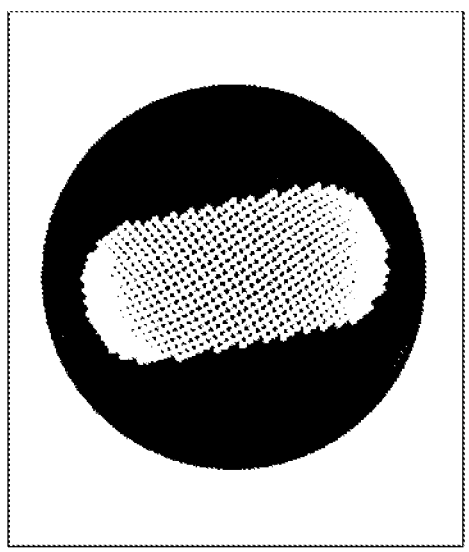
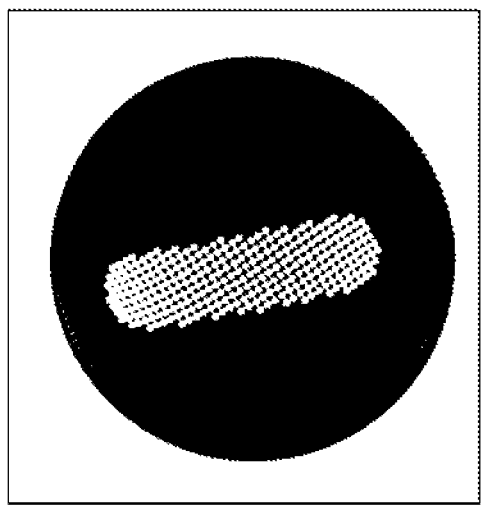
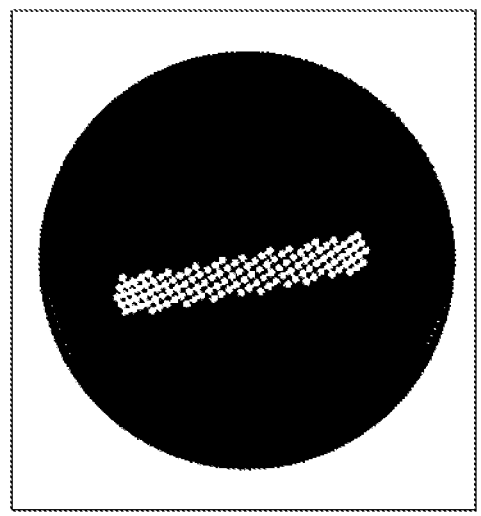
FIG. 18

*Indices and sets:*

| | |
|---|---|
| $c \in C$ | set of all coverage points |
| $p \in P$ | set of all payloads |
| $t \in T$ | set of all time periods, ordered |
| $s \in S$ | set of satellites |
| $r \in R_p$ | set of revisit periods for payload $p$ |
| $\bar{t} \subset T \in \bar{T}_{pr}$ | set of revisit time periods for payload $p$ |
| $b \in B_{rp}$ | set of the number of orbits in revisit period $r$ for payload $p$ |
| $\hat{t} \in \hat{T}_{rpb}$ | set of time periods in orbit $b$ in revisit period $r$ for payload $p$ |
| $\bar{s} \subset S \in \bar{S}_p$ | set of satellites to have payload scheduled |
| $d \in D_{p\bar{s}}$ | set of directions a payload can operate in |
| $\tilde{t} \in \tilde{T}_{ps} \ni T$ | set of time periods in which the payload $p$ is already on for satellite $s$ |
| $w \subset T \in W_{\bar{s}pn}$ | set of time periods in duty window $n$ for satellite $s$ and payload $p$ |
| $f \subset P \in F_{\bar{s}p}$ | set of conflicting payloads $f$ with payload $p$ |

*Data:*

| | |
|---|---|
| $first_{cp}$ | bonus points given for covering point $c$ with payload $p$ the first time |
| $points_{cp}$ | points for covering of point $c$ with payload $p$ |
| $min_{sp}$ | minimum number of time periods a payload $p$ may be on for satellite $s$ |
| $max_{sp}$ | maximum number of time periods a payload $p$ may be on for satellite $s$ |
| $cover_{cp\bar{s}td}$ | 1 if coverage point $c$ is cover by payload $p$ on satellite $s$ for direction $d$ in time $t$; otherwise 0 |
| $duty_{sp}$ | duty percentage for payload $p$ on satellite $s$ |

*Decision variables:*

| | |
|---|---|
| $X_{p\bar{s}t}$ | 1 if payload $p$ is turned on at the start of time $t$ for satellite $\bar{s}$; otherwise 0 |
| $\hat{X}_{p\bar{s}t}$ | 1 if payload $p$ is turned off at the start of time $t$ for satellite $\bar{s}$; otherwise 0 |
| $Y_{p\bar{s}td}$ | 1 if payload $p$ is on for satellite $\bar{s}$ is on in time $t$ in direction $d$; otherwise 0 |
| $Z_{cpr}$ | 1 if coverage point $c$ is covered by payload $p$ in revisit period $r$; otherwise 0 |
| $\bar{Z}_{cprsb}$ | 1 if coverage point $c$ is covered by payload $p$ in revisit period $r$ on orbit $b$; otherwise 0 |
| $\hat{Z}_{cpr}$ | number of times coverage point $c$ is covered by payload $p$ during revisit period $r$ $p$ in revisit time $t$ |

FIG. 19A $$\text{(Payload) max} \sum_{p \in P} \sum_{c \in C} \sum_{r \in R} \sum_{\bar{t} \in \bar{T}_{rp}} \text{points}_{cp} \hat{Z}_{cpr} + \text{first}_{cp} Z_{cpr} \quad (17)$$

$$X_{pst} + \hat{X}_{p\bar{s}t} \leq 1 \quad \forall p \in P, \bar{s} \in \bar{S}_p, t \in T \quad (18)$$

$$\sum_{\hat{t} \leq t} X_{ps\bar{t}} \geq \sum_{\hat{t} \leq t} \hat{X}_{p\bar{s},\hat{t}} \quad \forall p \in P, \bar{s} \in \bar{S}_p, t \in T \quad (19)$$

$$\sum_{\hat{t} \leq t} X_{ps\bar{t}} \geq (\sum_{\hat{t} \leq t} \hat{X}_{p\bar{s},\hat{t}}) - 1 \quad \forall p \in P, \bar{s} \in \bar{S}_p, t \in T \quad (20)$$

$$\sum_{\hat{t} \leq t} (X_{ps\bar{t}} - \hat{X}_{p\bar{s},\hat{t}}) = \sum_{d \in D_{ps}} Y_{p\bar{s}td} \quad \forall p \in P, \bar{s} \in \bar{S}_p, t \in T \quad (21)$$

$$\sum_{f \in F_p} \sum_{d \in D_{p\bar{s}}} Y_{f\bar{s}td} + \sum_{d \in D_{ps}} Y_{p\bar{s}td} \leq 1 \quad \forall p \in P, \bar{s} \in \bar{S}_p, t \in T \quad (22)$$

$$\text{min}_{\bar{s}p} X_{pst} \leq \sum_{(t - \text{min}_{sp} \geq \hat{t} \leq t)} \sum_{d \in D_{ps}} Y_{p\bar{s}\hat{t}d} \quad \forall p \in P, \bar{s} \in \bar{S}_p, t \in T \quad (23)$$

$$\sum_{(t - \text{max}_{sp} \geq \hat{t} \leq t)} \sum_{d \in D_{ps}} Y_{p\bar{s}\hat{t}d} \leq \text{max}_{\bar{s}p} \quad \forall p \in P, \bar{s} \in \bar{S}_p, t \in T \quad (24)$$

$$\sum_{w \in W_{zpn}} \sum_{d \in D_{ps}} Y_{p\bar{s}wd} \leq \text{duty}_{\bar{s}p} \quad \forall p \in P, \bar{s} \in \bar{S}_p, n \in N \quad (25)$$

$$\sum_{\bar{s} \in \bar{S}_p} \sum_{\bar{t} \in \bar{T}_{pr}} \sum_{d \in D_{ps}} \text{cover}_{cp\bar{s}\bar{t}d} Y_{p\bar{s}\bar{t}d} \geq Z_{cpr} \quad \forall p \in P, c \in C, r \in R_p \quad (26)$$

$$\sum_{\bar{t} \in \bar{T}_{prb}} \sum_{d \in D_{ps}} \text{cover}_{cp\bar{s}\bar{t}d} Y_{p\bar{s}\bar{t}d} \geq Z_{cprsb} \quad \forall p \in P, c \in C, \bar{s} \in \bar{S}_p, r \in R_p, r \in B_{rp} \quad (27)$$

$$\sum_{\bar{s} \in \bar{S}_p} \sum_{b \in B_{pr}} Z_{cprsb} = \hat{Z}_{cpr} \quad \forall p \in P, c \in C, r \in R_p \quad (28)$$

$$(29)$$

(17) Maximizes the number of points
(18) Satellite cannot be both on and off
(19) Satellite must be on before it can turn off
(20) Satellite cannot turn on multiple times in a row
(21) Set satellite on variable to indicate when satellite is on
(22) Only one conflicting payload may be on at a time
(23) Enforce minimum on time
(24) Enforce maximum on time
(25) The duty percentage must be less then the defined duty percentage
(26) The first visit can only occur once and only if the coverage point is visited

FIG. 19B during the revisit period
(27) The number of orbital visits is equal to the number of times a coverage points is covered during a each orbit
(28) The number of visits is equal to the number of times a coverage points is covered during a revisit period

FIG. 19C

OPTIMIZATION SYSTEM OF HETEROGENEOUS LOW EARTH ORBIT MULTI-USE SPACECRAFT

CROSS REFERENCE TO RELATED PATENT APPLICATIONS

This disclosure incorporates by reference the following U.S. patents: (1) U.S. Pat. No. 10,659,148, title: Systems and Methods for Command and Control of Satellite Constellations; and (2) U.S. Pat. No. 10,020,876, title: Systems and Methods for Command and Control of Satellite Constellations. The contents of these patents are incorporated by reference herein as if each was restated in full.

FIELD

The presently disclosed subject matter relates generally to an optimization system for managing heterogeneous low-earth orbit spacecrafts. In particular, the present application relates to a constellation planning and management system that automatically generates satellite payload tasking and communications tasking between satellites and between satellites and ground stations.

BACKGROUND

Large heterogeneous multi-payload earth observation satellite constellations with intermittent asymmetric connectivity are impossible to manage manually or with traditional constellation management systems.

Each spacecraft has its own unique set of characteristics, such as the following. Each new launch may have new hardware. New subsystem software may be released continuously. Each spacecraft may have individualized licensing restrictions on communications and payloads. Attitude control capabilities and performance may vary in each spacecraft. There will be contention for attitude selection from different subsystems. Power profile on each spacecraft may vary. One common issue among all spacecrafts is that there may be insufficient power for all subsystems to operate continuously. Thermal generation and dissipation may vary among spacecrafts by design version and operational state. Each satellite may have unique hardware timing issues, including, but not limited to, issues with respect to subsystem bootup and shutdown times, progress rate for various operations like data processing, file transfers, and slewing, among other possibilities. Each spacecraft may have a unique collection of hardware uplink and downlink capabilities and data rates. Each spacecraft may have a unique collection of payloads with observational or other capabilities. Each spacecraft may also have unique restrictions on which subsystems can be operated simultaneously. Further, each spacecraft may have unique attitude restrictions of individual subsystems.

Communications are intermittent, asymmetric, and in some cases have long delays, for example, on the order of several seconds for a roundtrip.

In addition, each ground station may have its own unique set of characteristics, including one or more of the following (1) licensing restrictions on communications, (2) hardware timing, and (3) collection of hardware uplink and downlink capabilities, interference, and data rates for each, among other possibilities.

As a result, it is not practical for a system of this complexity to have humans in the loop determining tasking. The assets are highly complex with non-linear behavior that is non-trivial to model a priori. There is a need to fully automate operations, with humans responsible for troubleshooting. Further, there is a need to maximize the value of the data produced by a fleet of low earth orbit multi-use spacecraft as measured by data type, geographic coverage and revisit rates, latency and quality. Embodiments of the present disclosure are directed to this and other considerations.

SUMMARY

Aspects of the disclosed technology include an optimization system for managing a constellation of satellites. The optimization system may include a constellation configuration system including a first processor. The first processor is configured to receive at least one mission objective defined by a user and instruct one or more satellites to allocate one or more resources according to the mission objective. The optimization system may include a constellation planning system including a second processor. The second processor is configured to resolve contentions between and optimize usage of satellite and ground station resources at a constellation level, schedule uplink and downlink communications between the one or more satellites and a ground station and schedule a cross-link communication between at least two satellites. The optimization system may include a node planning system including a third processor. The third processor is configured to determine whether a constellation plan is safe for an asset of the one or more satellites, autonomously in real time task the one or more satellites based on the constellation plan, send a command to the one or more satellites to execute the constellation plan when the constellation plan is safe, and perform intervention when the constellation plan is unsafe. The optimization system may include an asset profiling system including a fourth processor. The fourth processor is configured to evaluate predicted performance of the system optimized against observed performance.

In one example, the node planning system may transmit an objective to the one or more satellites to be pursued locally. The node planning system may task the one or more satellites by transmitting real time data including sensor values.

One aspect of the disclosed technology relates to a constellation planning system. A processor is configured to receive a request, from a client, to create a planning task for one or more satellites in a constellation of satellites, the request including a planning problem object. The processor may generate a status of the planning task describing a progress of the planning task. The processor may return the status to the client. If the status of a task is SUCCESS, then the client may retrieve a resulting schedule and publish it to the constellation.

Another aspect of the disclosed technology relates to a node planning system. The system may include a processor configured to task subsystems of a satellite in an optimal way, detect a failure on the satellite, perform repair on the satellite, and generate an alert notifying a user of the detected failure.

A further aspect of the disclosed technology relates to a method for planning tasks for a constellation of satellites. The method may receive a request, by a processor, from a client, to create a planning task for one or more satellites in a constellation of satellites, the request including a planning problem object. The processor may generate a status of the planning task describing a progress of the planning task. The processor may return the status to the client. If the status of a task is SUCCESS, then the client may retrieve a resulting schedule and publish it to the constellation.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIGS. 8A-F illustrate sample POST request to create a planning task according to one aspect of the disclosed technology.

FIGS. 9A-B illustrate a sample success response according to one aspect of the disclosed technology.

FIG. 10 illustrates a sample error response according to one aspect of the disclosed technology.

FIGS. 13A-C illustrate sample mathematical formulas for a transit splitting strategy according to one aspect of the disclosed technology.

FIG. 17 provides a schematic illustration of payload coverages on earth according to one aspect of the disclosed technology.

FIG. 18 illustrates different footprint sizes according to one aspect of the disclosed technology.

FIGS. 19A-C illustrate sample mathematical formulas in connection with payload coverage according to one aspect of the disclosed technology.

DETAILED DESCRIPTION

Particular implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the identification of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. In general, the same references numbers will be used throughout the drawings to refer to the same or like parts.

Figure 1:
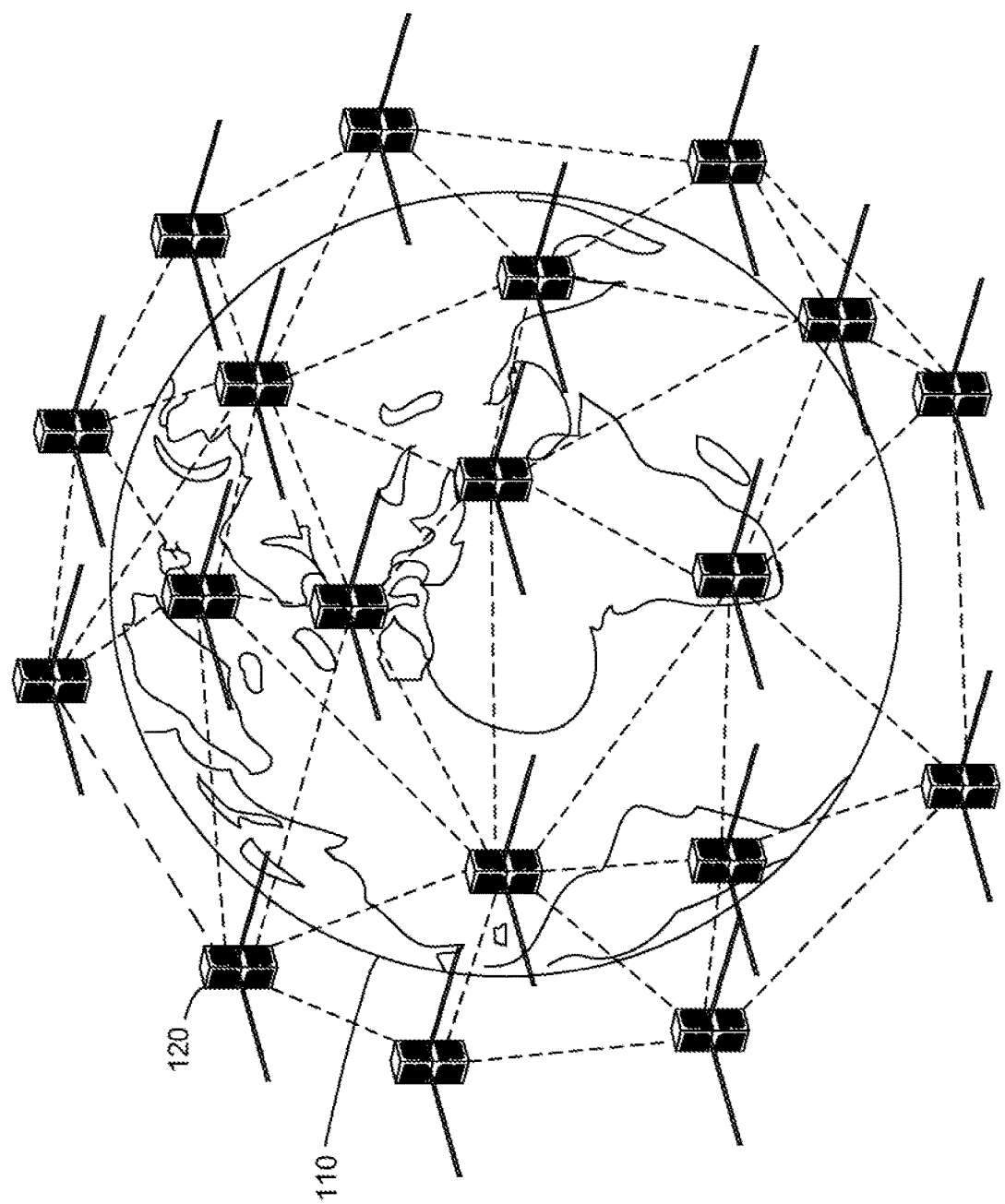
FIG. 1 illustrates an example terrestrial and orbital communication network according to one aspect of the disclosed technology.

The present application relates to, but not limited to, a terrestrial and orbital communication network having a constellation of satellites. FIG. 1 illustrates an exemplary terrestrial and orbital communication network 100 covering at least a portion of a planet 110, such as the Earth. The network 100 may include a constellation of spacecraft 120, such as satellites, each configured to collect data from a point on the planet from time to time or on a regular basis. In one example, the satellite 120 may analyze the collected data to monitor maritime activities, including but not limited to tracking ship or oceangoing vessels, detecting illegal, unreported and unregulated fishing or pirate activities, monitoring weather patterns and trade transit, and detecting oil spill, among other possibilities.

In one example, the satellite 120 may be a cubesat having a small form factor. For instance, the size of the satellite 120 may be relatively small, in general not exceeding 10 cm×10 cm×30 cm stowed and 10 kg of mass. In one embodiment, the satellite 120 may be based on an industry standard, developed in 2001 by Stanford University and California Polytechnic Institute and described in the document "CubeSat Design Specification." Cubesats may be launched and deployed using a common deployment system. For example, cubesats may be launched and deployed from a mechanism called a Poly-PicoSatellite Orbital Deployer (P-POD). P-PODs may be mounted to a launch vehicle and carry cubesats into orbit. P-PODs may deploy cubesats once a proper signal is received from the launch vehicle.

Figure 2:
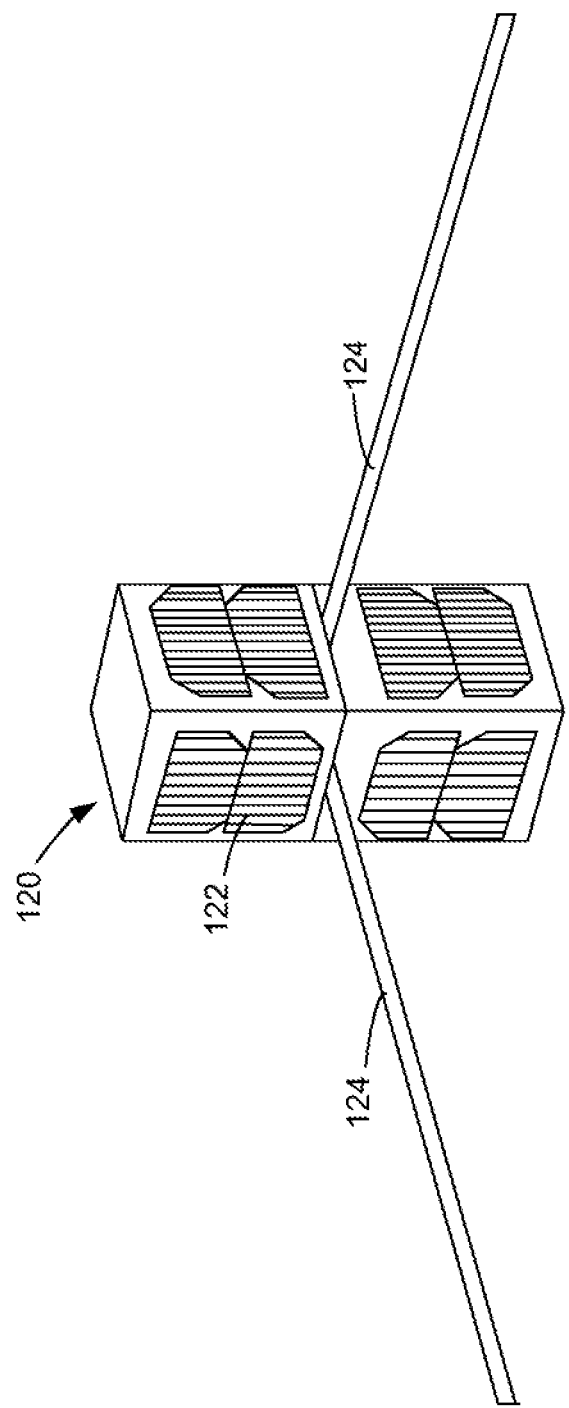
FIG. 2 is a schematic drawing of a satellite according to one aspect of the disclosed technology.

FIG. 2 is a schematic drawing of a satellite 120 according to one aspect of the disclosed technology. As shown in FIG. 2, the satellite 120 may include one or more solar panels 122. The solar panels 122 may be configured to provide energy to one or more components contained within the satellite 120. The satellite 120 may also include one or more antennas 124 that may extend when fully deployed.

Figure 3:
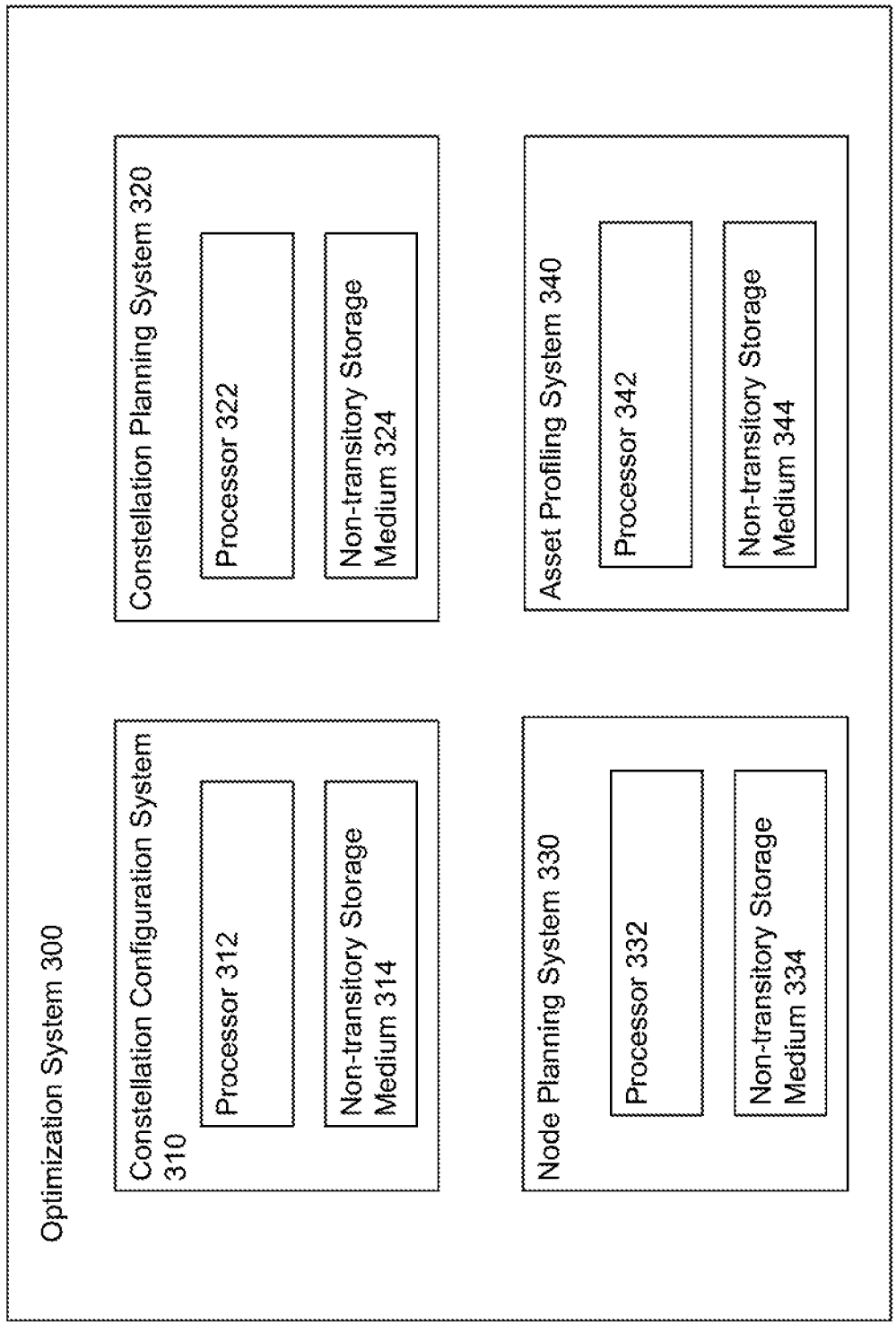
FIG. 3 is a block diagram of an optimization system 300 according to one aspect of the disclosed technology.

FIG. 3 illustrates an optimization system 300 that performs automated planning for the constellation of satellites 120. The optimization system 300 may include one or more subsystems, including a constellation configuration system 310, a constellation planning system 320, a node planning system 330 and an asset profiling system 340, each subsystem may include processors 312, 322, 332 and 342, and non-transitory storage mediums 314, 324, 334 and 344. In this context, optimization does refer to a single solution but embraces system determined enhanced operations that implement selective resource allocations.

The constellation configuration system 310 may enable constellation customers, internal and external, who may have wildly different and even conflicting goals, define their mission objective. The system 310 may also enable satellite operations to allocate resources across missions.

The constellation planning system 320 may be responsible for making tradeoffs across all assets in the optimization system 300 as a whole, thereby resolving contention for resources in a way that maximizes the value of the data generated. The constellation planning system 320 among other things may schedule communications between satellites and ground stations including uplink and downlink communications between the satellites and the ground stations. The constellation planning system 320 may also schedule communications between satellites, such as cross-link communications between satellites. The constellation planning system 320 may include a set of time windows.

The node planning system 330 may be responsible for making tradeoffs locally at the asset level based on the most recent real-time information available about that asset. The node planning system 330 may receive one or more constellation plans from the constellation planning system 320. The node planning system 330 may use local real-time information as input to proactively elaborate on the constellation plan by making additional local decisions for how to task various subsystems. When necessary, the node planning system 330 may intervene and abort the constellation plan provided by the constellation planning subsystem 330 to keep the spacecraft safe, which is the number one overarching goal. The node planning system 330 among other things may make decisions to either execute the constellation plan or intervene if it is unsafe for the asset, pursue sub-objectives (for example, one constellation level goal of performing an observation may require the spacecraft to pursue a local goal of acquiring a target on time), or automatically detect and recover from hardware errors. The node planning system 330 may consume data about the state of the spacecraft including faults, attitude, local time, energy level, thermal level, among other possibilities.

The node planning system 330 may output commands to spacecraft subsystems telling them what they need to do. The node planning system 330 may produce time series telemetry that is ingested by the asset profiling system 340. The node planning system 330 may produce log data.

The asset profiling system 340 may enable a closed loop aspect of the optimization system 300. The asset profiling system 340 may continuously evaluate predicted vs observed performance of the optimization system 300, enabling the constellation level planner to automatically recover from errors, enabling the system to automatically learn about performance degradations or improvements of the individual assets, and finally enabling the development team to incrementally improve the fidelity of the predictions produced by their models.

Figure 4:
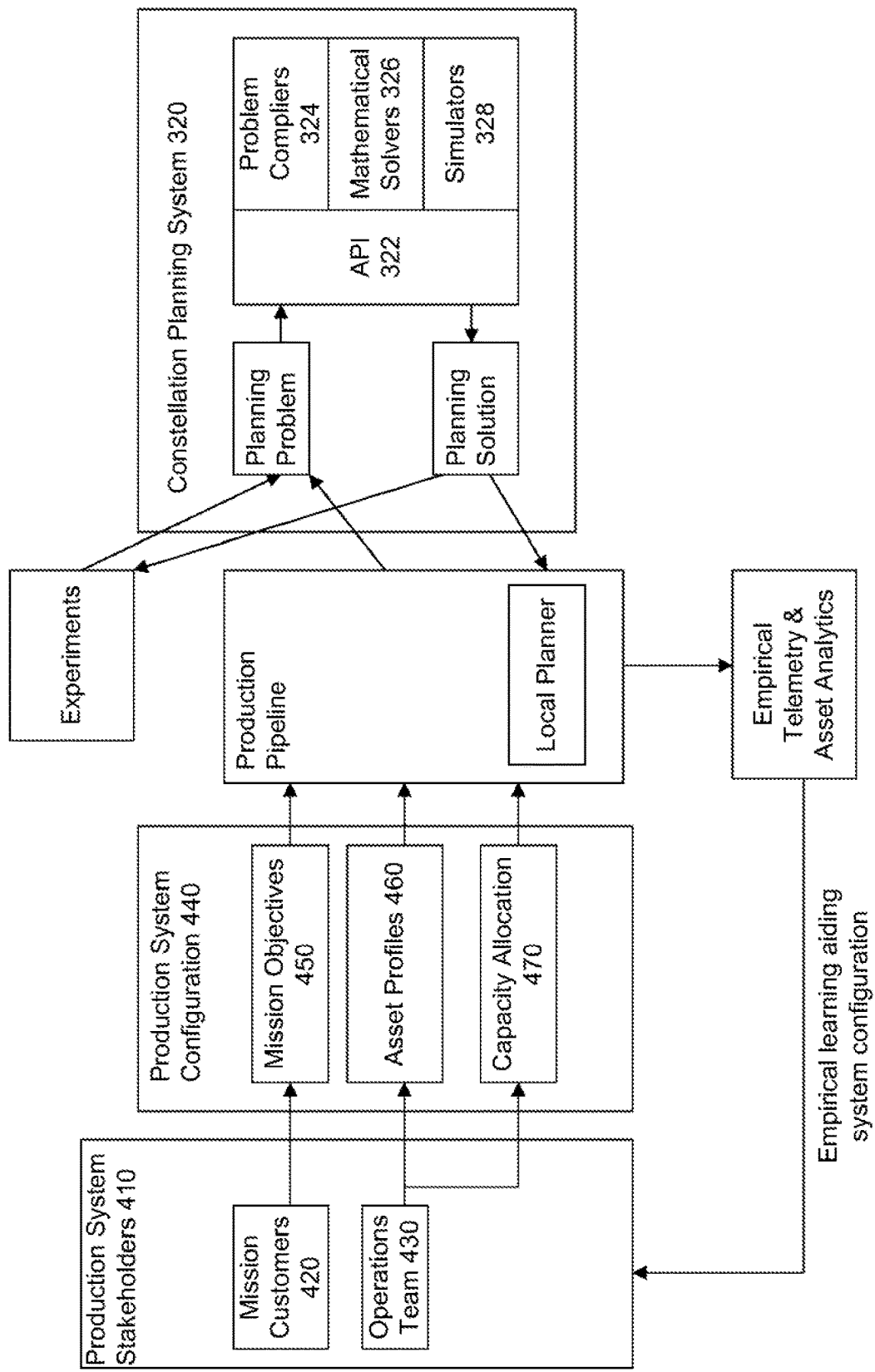
FIG. 4 is a block diagram of a constellation planning system according to one aspect of the disclosed technology.

FIG. 4 is a superset of FIG. 3. FIG. 4 also describes the workflow, processes and stakeholders that the software components serve. Referring to FIG. 4, production system stakeholders 410 may include mission customers 420 and satellite operations team 430. The mission customers 410 may be internal or external users of the multi-use spacecraft. The mission customers 410 may define mission objectives 450 for their specific mission that must be maximized by the constellation within the confines of the resources allocated to that specific mission by satellite operations. The satellite operations team 430 may define asset profiles 460 and explicit capacity allocation 470 to allocate constellation resources across missions based on the tooling provided by the constellation planning system 320.

An asset profile 460 may include one or more of the following: one or more spacecraft models, one or more spacecraft subsystem models, and one or more ground station profiles. The spacecraft model may include one or more of the following: (1) enumeration of subsystems, (2) constraints, permissible state combinations for attitude, subsystems, (3) bus power model, (4) bus thermal model, and (5) licensing, what the asset is legally allowed to do, among other possibilities.

The spacecraft subsystem models may include models for payloads and radios, among other possibilities. The spacecraft subsystem models may include one or more of the following: (1) data rates indicating at what rates the asset is able to produce or transfer data, (2) power, such as power consumption as a function of subsystem state, (3) thermal, such as thermal impact as a function of subsystem state, (4) coverage model for subsystem antenna/optical system, (5) startup time, (6) shutdown time, (7) minimum on time, and (8) maximum on time, among other possibilities.

The ground station profile may include one or more of the following: (1) licensing indicating what the asset is legally allowed to do, and (2) communications model, among other possibilities.

Table 1 below illustrates example mission objectives 450.

TABLE 1

| Name | Type | Description |
| --- | --- | --- |
| id | uuid | UUID for the payload type |
| name | string | Name for the payload type |
| aoi | list[{geojson}] | List of convex polygons that the constellation planning system 320 converts into a set of coverage points. |
| aoi_goal | boolean | True if a payload is being scheduled with AOI goals in mind |
| revisit_rate | int | Desired revisit rate of a coverage point in the constellation planning system 320. Will be rounded up to the nearest 15 minutes. |
| conflicting_payloads | list[uuid] | Uuid's of payloads that cannot run in conjunction with this payload. I.E. For hardware reasons these payloads cannot run at the same time. (SatOps may own this fields values) |

Table 2 below illustrates example capacity allocation 470 at the system level.

TABLE 2

| Name | Type | Description |
| --- | --- | --- |
| id | uuid | UUID for payload type |
| max_data_volume | int | Maximum MB produced per 24 h |
| max_energy | int | Maximum Wh consumed by payloads of this id constellation wide over 24 h |
| max_thermal | int | Maximum Joule output by payloads of this id constellation wide over 24 h |

Table 3 below illustrates example capacity allocation 470 at the spacecraft level.

TABLE 3

| Name | Type | Description |
| --- | --- | --- |
| id | uuid | UUID for payload type |
| spacecraft | uuid | UUID for spacecraft |
| min_time_on | int | minimum time the payload may be turned on |
| max_time_on | int | maximum time the payload may be turned on |
| startup_time | int | time required for payload to start up |
| shutdown_time | | time required for payload to safely shut down |
| max_duty_ratio | int | Maximum MB produced per 24 h |
| max_energy | int | Maximum Wh consumed by payload over 24 h |
| max_thermal | int | Maximum Joule output by payload over 24 h |

The constellation planning system 320 may include an API 322. The API 322 may be a REST API. The API 322 may receive POST requests to create a planning task. The planning requests or the Post requests may be submitted by a separate cron-like system that invokes the planning system periodically, such as every 6 hours, automatically to add to the existing plan. Satellite operations may also if they make changes to the configuration system (for example enable or disable a ground station) manually execute a replan.

The request body may be a YAML planning problem object. After receiving the POST requests, one or more of the problem compilers 324, mathematical solvers 326 and simulators 328 may execute the POST requests. Upon successful creation of the planning task, the client is redirected to /api/v1/plans/{id}, which returns a status object describing the progress of the planning task. An example POST request is illustrated in FIGS. 8A-F. In one example, the constellation planning system 320 knows the status of each solver 326 whether it has terminated or not. The constellation planning system 320 may also ask the solver for progress information.

In one embodiment, valid requests may receive a 303 See Other redirect. Requests with invalid YAML payloads may be returned with 400 Bad Request. In one example, a valid request may be one where the YAML problem and request parameters are valid.

The planning request may specify a system model, a set of planning constraints (such as pre-scheduled activities), and an objective function.

The API 322 may receive a GET request requesting status information for a planning task. GET requests may return the status. If the status of a task is SUCCESS, then the client may retrieve a resulting schedule and publish it to the constellation.

THE API 322 may receive a DELETE request instructing the constellation planning system 320 that the task is obsolete and to halt planning.

In one embodiment, all requests for valid IDs may return 200 OK as illustrated in FIGS. 9A-B, even if the planning task encountered an error. In this case the response body may contain error information for the client to use as illustrated in FIG. 10.

Table 4 illustrates example error types.

TABLE 4

| Error Type | Description |
| --- | --- |
| ERR_INFEASIBLE_MODEL | The model was infeasible due to conflicting constraints. |
| ERR_INTERNAL_ERROR | The constellation planning system encountered an internal error. |
| ERR_TIMEOUT | The constellation planning system was not able to complete planning within the time limit. |

In one embodiment, the constellation planning system 320 may provide an optimization solution for satellite to ground communications. For instance, the value of downloading a chunk of data is a simple function taking the following inputs: (a) type of data downloaded, (b) age of data at time of download, and returning: points awarded. The goal of the optimization function is to maximize the number of points awarded over the planning period.

There may exist two types of transit, BIDIR transit and RXO transmit. The BIDIR transit may refer to a satellite transit over a ground station with bi-directional communications capabilities, that is both legal to schedule and supported by the available hardware on the ground and in space. The RXO transit may refer to a satellite transit over a ground station for which only downlink of data is supported that is both legal to schedule and supported by the available hardware on the ground and in space.

The constellation planning system 320 may provide an enhanced method for reducing contention for ground station time, such as reducing competing demand for ground station, from satellites by instead of scheduling entire transits scheduling transit segments, enabling multiple satellites that pass over a single ground station around the same time to all get a communication slot. This in turn results in each individual satellite having more frequent contact with the ground.

Contacts, such as communication windows between satellites and ground stations, are theoretically most efficient at their maximum elevation due to the minimization of atmospheric and reflective noise. This leads to a natural heuristic which favors scheduling contact time around the max elevation point of a given transit. To take advantage of this, sub-contacts are generated for the constellation planning system 320 as a preprocessing step by taking a configurable fraction of each transit, centered around the max-elevation time, and providing it as an additional contact option to the pipeline of the constellation planning system 320. Each split contact will be a fraction of the original contact's duration, subject to the constraints that its duration is long enough to ensure spacecraft maintenance and meaningful data download time. By providing these smaller contacts, the constellation planning system 320 may obtain more opportunities for non-conflicting contacts while preserving the best link conditions. The constellation planning system 320 will treat these contacts in the same way as their parent contacts and attempt to schedule them to maximize the data downlinked. Only one contact of the overlapping set will be chosen due to existing mutual exclusion constraints.

Figure 11:
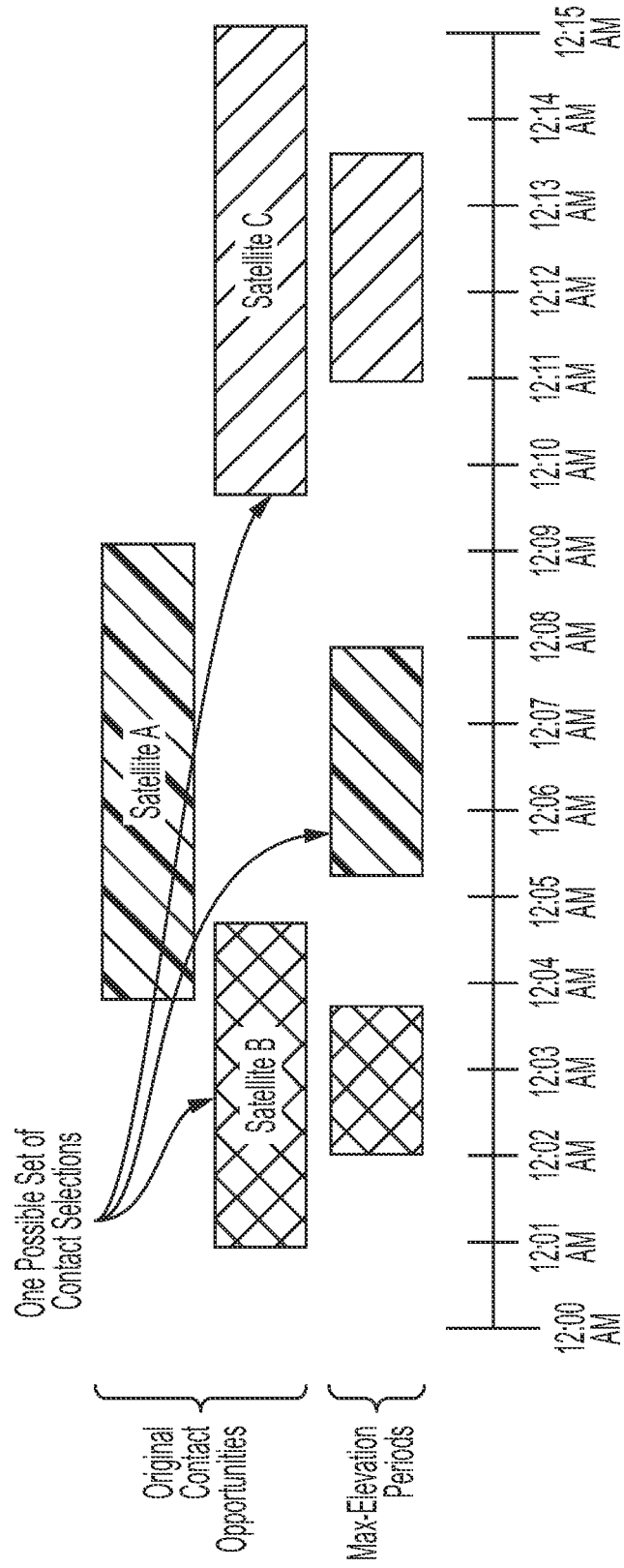
FIG. 11 provides a schematic illustration of fixed split strategy according to one aspect of the disclosed technology.

By adjusting the percentage of total transit time in a sub-transit, very short contacts on select satellites are made to maximize the performance of the infrastructure pipeline. In one example as illustrated in FIG. 11, there exists a set of three full transits: one each for satellites A, B, and C (labeled). Without transit splitting, a contact cannot be scheduled for both satellite A and B. However, applying the single split max-elevation heuristic, the full transit can be scheduled as contact for satellites B and C. For satellite A the potential contact is scheduled, centered on the max elevation, as a contact. This allows for significantly increased contact time for satellite A that did not exist prior to transit splitting.

In one embodiment, the constellation planning system 320 may base its contact assignment decisions on a schedule of transits that each satellite makes over each ground station, and also based on at least one of the following: a) the scheduled payload windows which it uses to estimate data volumes, and b) historical telemetry describing the pairwise bandwidth between ground stations and satellites. In one example, The constellation planning system 320 may make contact assignment decisions by solving a bin packing problem using a Mixed-Integer Programming (MIP) solver. A payload window may be a time frame during which a payload, typically associated with one or multiple missions, is active. Also associated with a payload window (in addition to start and end time) may be various configuration parameters for the payload.

In another embodiment, the constellation planning system 320 may implement a semi-continuous splitting strategy. When executing the semi-continuous spitting strategy, the constellation planning system 320 may determine whether a path of satellite is selected, select a specific point in that transit, and dynamically determine a time frame on each side of the selected point, such as before and after the selected point, for making a contact. This strategy may make the decision of if the contact is to be scheduled and how much time on either side of the peak elevation should be used as link time for a given satellite in order to maximize the value of the data downloaded across the constellation, given existing models of payload data generation rates and the marginal value of data packages. This extension may require underlying model changes as it may allow for each transit total contact time to be assigned in the model instead of being a fixed property of the transit. As a result, contacts may optimally fill the time and not leave unnecessary gaps between contacts.

Figure 12:
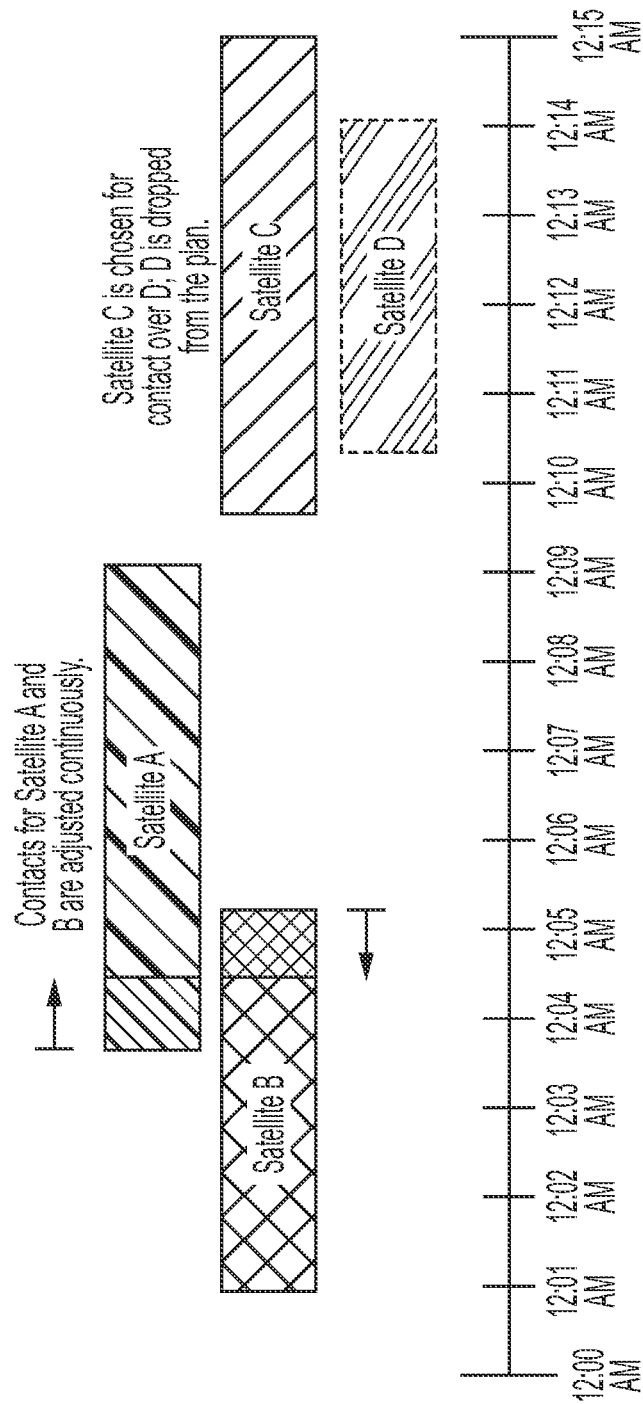
FIG. 12 provides a schematic illustration of variable contact length strategy according to one aspect of the disclosed technology.

FIG. 12 illustrates an example solution for the Variable Contact Length Strategy. When executing the variable contact length strategy, the constellation planning system 320 may determine whether a path of satellite is selected, determine whether to select the contact, determine the starting time for the contact, and determine the end time for the contact. In this example there are four transits for four satellites that overlap. The model will have a decision variable for whether the contact was selected. In FIG. 12, contacts A, B, and C were scheduled, but the transit for satellite D was not selected. All of the other contacts are shortened optimally to provide additional contact time that maximizes the goal function.

The constellation planning system 320 may adjust contact length to fit the needs of the constellation. The constellation planning system 320 may generate only one decision variable per transits, as opposed to two for the single split strategy.

FIGS. 13A-C illustrate mathematical formulas that are implemented by the constellation planning system 320 for the contact planning process.

Figure 14:
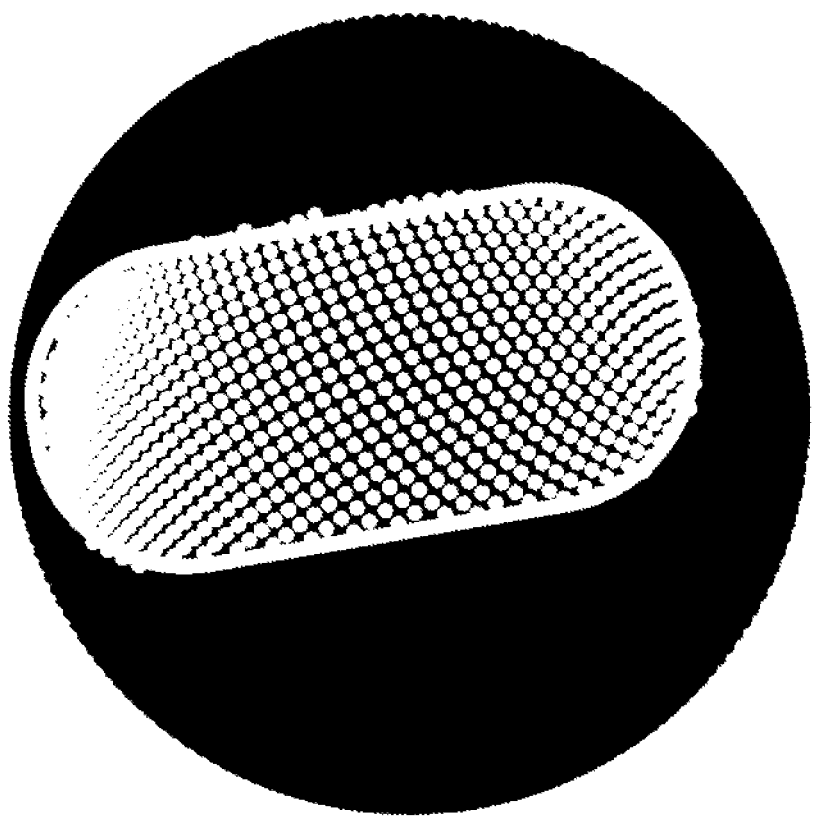
FIG. 14 provides a schematic illustration of satellite transit coverage on earth according to one aspect of the disclosed technology.

In another embodiment, the constellation planning system 320 may perform payload scheduling. FIG. 14 provides a representation of earth that allows for the system to determine what constitutes coverage of an area. A set of points, referred to as coverage points, are nearly evenly spaced around the globe. If a coverage point is said to be covered, that indicates that the satellite has passed over and observed the entire area that is represented by that coverage point. If a satellite covers anything less than 100% of the area represented by the coverage point it will be considered uncovered. This guarantees that if all of the points are considered covered the entire globe is more than covered. One may for example target 10,000 points with each point representing a circle with a radius of approximately 130 km. This is believed to be fine enough resolution as a satellite footprint covers over 40 coverage points.

For automatic identification system (AIS) and Automatic Dependent Surveillance-Broadcast (ADS-B), 10,000 coverage points may provide a high enough resolution to select targeted areas of interests while maintaining performance when solving. Radio occultation (RO) collection may be defined to occur at pre-computed collection points and is not based on the satellite footprint.

In FIG. 14, the yellow/blue points may represent the evenly spaced points on a sphere. The yellow patch may represent a satellite transit for a short time. The orange elongated circle may represent the area that was covered during satellite transits. FIG. 14 may not be drawn to scale.

The planning period for payload scheduling may for example be 48 hours into the future with the first 42 hours being essentially fixed. Time within the planning period may be discretized into predefined resolution, for example 15 minute intervals. Desired revisit rates may be provided at any interval of this length, i.e. optimize to achieve global coverage every hour may be a goal. Multiple visits of a coverage point within 15 minutes may be allowed and weighted.

In one example, this planning period may be specifically chosen with the ADS-B revisit rate requirement in mind and may support maximizing the ADS-B payload coverage around in area of interests or globally every 15 minutes.

Figure 15:
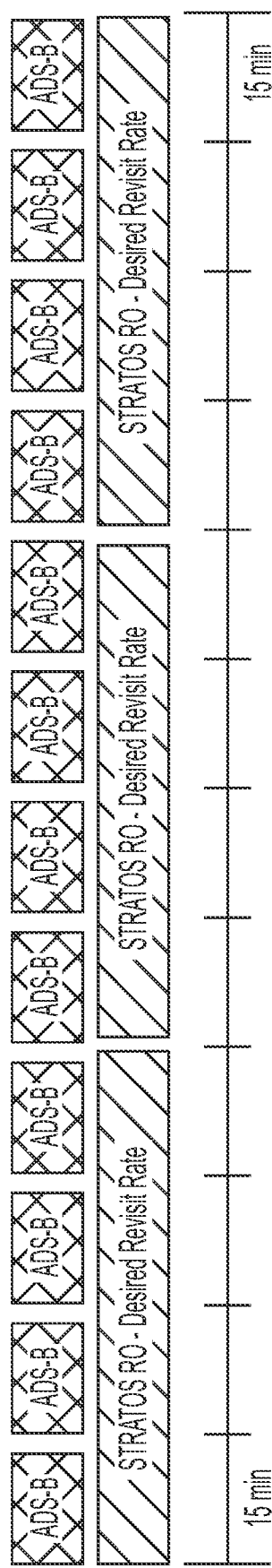
FIG. 15 provides a schematic illustration of different revisit rates according to one aspect of the disclosed technology.

Referring to FIG. 15, the constellation planning system 320 has the flexibility to set revisit goals for different time lengths. The ADS-B payload could request a revisit rate of every 15 minutes while STRATOS RO is shown with a revisit rate of 1 hour.

The primary operational constraints taken into consideration outside of coverage are duty ratio, minimum and maximum payload window length, and payload exclusions. In one embodiment, duty ratio will never be greater than 15% over a 6 hour period and over the entire planning period, the duty ratio will not be exceeded. This is to ensure balancing of payload windows across the planning horizon. The minimum and maximum window length will not be violated. For payloads that cannot run at the same time, such as SAAM AIS and SAAM ADS-B, the constellation planning system 320 may not schedule them simultaneously. In one embodiment, the constellation planning system 320 may handle manually added payloads as part of the duty ratio but will never alter them.

Figure 16:
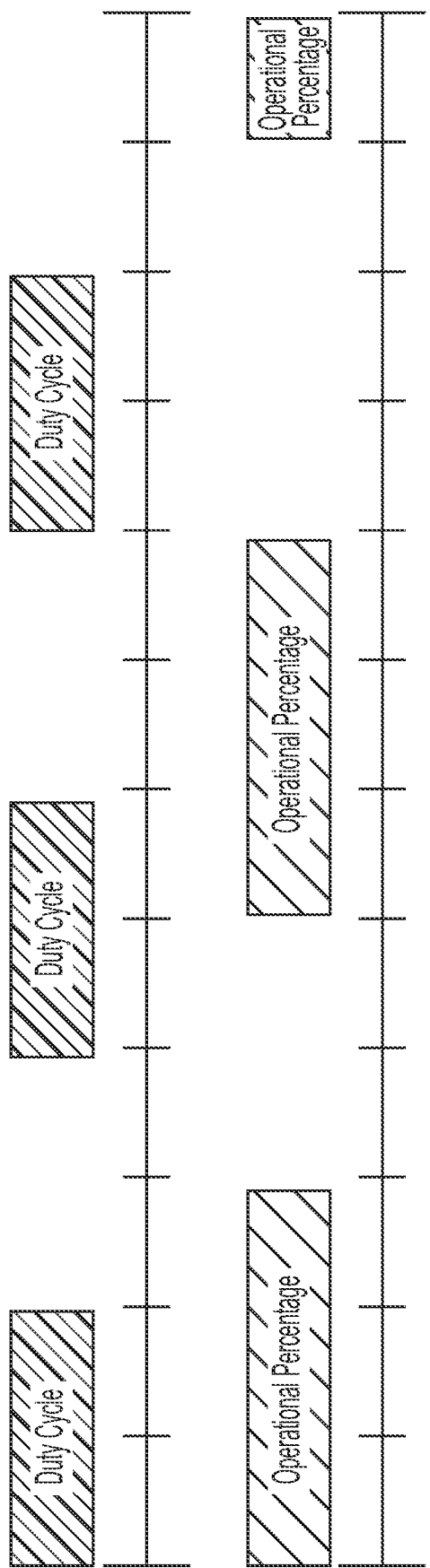
FIG. 16 provides a schematic illustration of duty cycle and operational percentage according to one aspect of the disclosed technology.

As shown in FIG. 16, by moving away from duty cycle to duty ratio, the constellation planning system 320 is given more flexibility to maximize the value of each payload window. Duty ratio may be calculated as time_on/time_lapsed. For instance, if the time horizon is 24 hour, and the on time is 6 hours, then the duty ratio is 25%. With duty cycles (the top line in FIG. 16), the payload windows follow a predictable pattern that result in high periodicity of the payload window collection, which may be undesirable. With duty ratio (the bottom line in FIG. 16), the payload is "on" or operating the same amount of time but the flexibility is greatly increased.

One other consideration is very long payload windows. The constellation planning system 320 may handle this through a payload extension application. Payloads may be allowed to be extended for an infinite amount of time into the future, but may be arbitrarily cutoff at a predefined number of hours into the future. This may be accomplished by modifying already existing payload windows. Satellites may have a duty ratio of 1, which means the payload is always on, but not schedule payload windows. This is to have that coverage be included in the optimization for free, and the other satellites will schedule around this coverage.

This feature may add significant value once the next generation of the satellites operates STRATOS, AIS and ADS-B at 100% duty cycle.

Specific operational constraints for each team may be built into the constellation planning system 320 during the development as they are encountered.

The constellation planning system 320 may handle two different payload types. The first is global coverage that looks to cover or observe the entire globe at a set revisit rate. The second is an AOI payload type. In one embodiment, no single payload is allowed to want both types of coverage simultaneously.

In one example, ADS-B may be a customer of the AOI payload type and global coverage will be both STRATOS and AIS.

The global coverage payload type may regard the entire earth to be valuable for the payload and power is the limiting factor. Global coverage may be defined to be achieved if the payload has blanketed every coverage point during the defined revisit time.

One key difference between AOI and global coverage is how potential payload windows are created. Since a satellite never leaves an area of interest the theoretical optimal solution for payload windows is an infinite payload window or with duty ratio constraints it might be optimal to rapidly cycle the payload on and off. This creates an undesirable power situation and certain payloads have strict minimum and maximum time which this would violate. To counteract this payloads will be on or off during an entire time period, i.e., payload windows for satellites in global coverage will have payloads that are multiples of 15 minutes. This also requires that minimum and maximum payload time be multiples of 15 minutes.

AOI payloads may have the ability to target given areas on earth to execute payload windows. Payload teams will provide a set of convex polygons that define the area of interest into coverage points, provided to the constellation planning system 320 via a list of GeoJSONs. The constellation planning system 320 will then convert the AOI into a set of coverage points that ensure the entire polygon is covered. Every time an FM passes over an AOI defined for it then it will create a potential payload window that is given to the constellation planning system 320 to determine if that payload window should be executed or not. Potential payload windows are generated based on the entrance and exiting of the AOI and extended equally on each side to meet the minimum payload window operation time. If the AOI potential payload window is greater than the maximum payload window time it will be split into multiple windows. AOI's may be changed whenever the payload team desires, and will switch the AOI automatically in the optimization with no need for human input.

With reference to FIG. 17, AOI is highlighted in yellow circle. The coverage points highlight orange. Potential payload windows are shown as rounded rectangles. On the left the potential payload blue and purple would result in full coverage. While the two potential windows on the right, blue and red, may not result in full coverage. Therefore, the constellation planning system 320 would choose the left which results in total coverage. FIGS. 19A-B illustrate steps performed by the constellation planning system 320 during the process of generating payload windows and determining which payload window to use.

Each payload may have an observational footprint defined for each 15 minute time interval. Payload may be a subsystem on the spacecraft. For example, a payload may be a ship tracking payload or a weather tracking payload. The constellation planning system 320 natively may support payloads that collect cone shaped footprints of a defined radius. The radius will be defined on a per FM basis. This is believed to be primarily applicable to the current AIS and ADS-B payloads. Payloads whose footprint is irregular or point base will be handled on a case-by-case basis. For STRATOS, SOE files may be used to create footprints for the 15 minute intervals.

As shown in FIG. 18, different footprint size is natively supported by the constellation planning system 320, such as 500 km, 1,000 km, and 2000 km radius footprints shown from left to right.

In production, the constellation planning system 320 may seek to meet all of the revisit goals first, and then to obtain the most additional coverage until the duty ratio is met for each payload. Specifically, the constellation planning system 320 may obtain a large value by covering the AOI or globe the first time during a revisit period and then a greatly reduced, but still positive value for each subsequent pass. This may result in the constellation planning system 320 running payloads at their defined duty ratio.

FIGS. 19A-C illustrate mathematical formulas that are implemented by the constellation planning system 320 for the payload planning process.

The node planner may include an automated repair framework. The automated repair framework may be able to disable, with individual granularity, specific automated repairs on a per-satellite basis. The automated repair framework may be able to blanket disable all repairs (i.e., detection-only or "dry run" mode). The automated repair framework may preserve failure knowledge and repair state through the node planning system 330 and OBC restarts or power cycles. The automated repair framework may retrieve failure and repair status through SPOC. The automated repair framework may prevent multiple potentially conflicting repairs from being executed simultaneously. Detection and repair implementations may be relatively independent and uncoupled. The automated repair framework may have a failure mode which may attempt multiple repair strategies in an escalation sequence. When a failure is detected and automated repair is attempted, the satellite operations team 430 may be notified of the activity. When automated repair escalations are exhausted and the subsystem is still in a failing state, the satellite operations team 430 may be notified of the situation.

Figure 5:
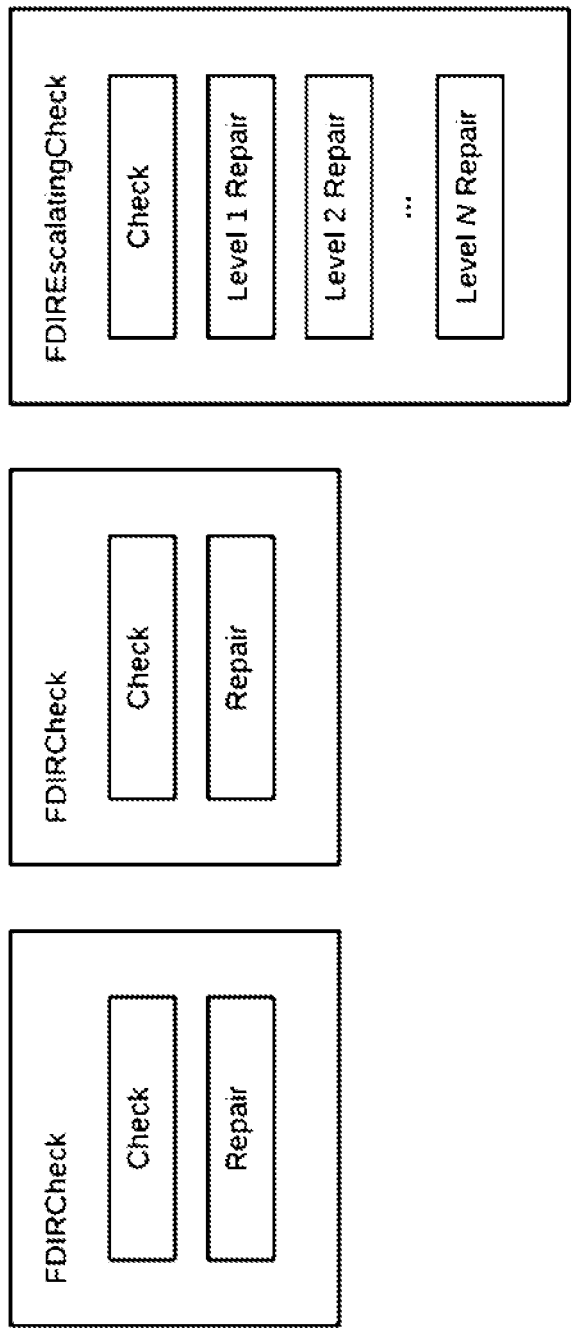
FIG. 5 is a block diagram illustrating implementation of a node planning system according to one aspect of the disclosed technology.

FIG. 5 illustrates example implementation of the automated repair framework. Checks and associated repair strategies may be implemented via subclasses of FDIRCheck. The automated repair framework may process one or more FDIRChecks periodically.

The automated repair framework may encompass a wide range of failure modes and repair strategies, while encouraging implementations of checks and repairs to be modular and self-contained, and, in some cases, authored and maintained by payload or satellite bus teams.

Figure 6:
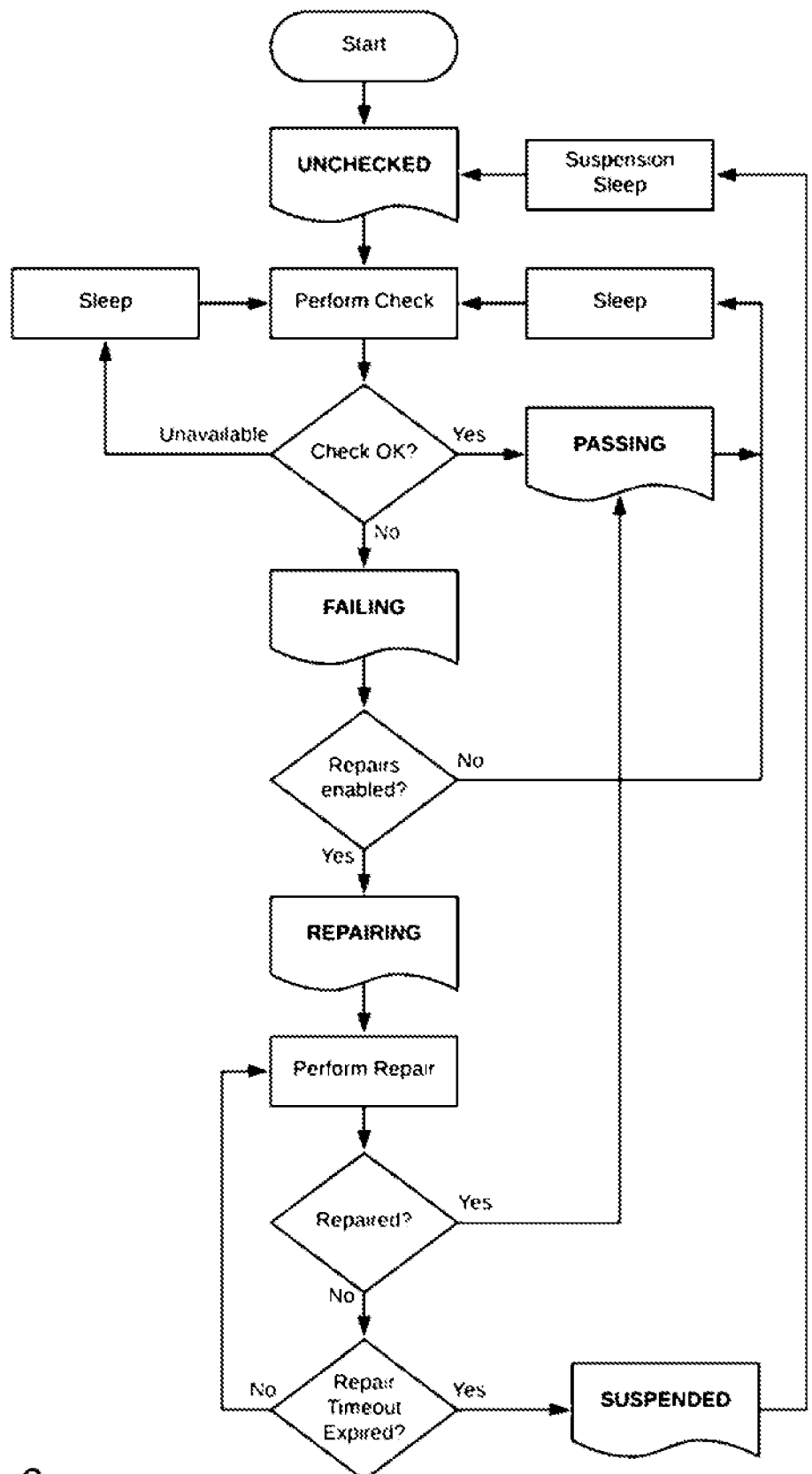
FIG. 6 is a flow diagram illustrating procedures of FDIR-Check according to one aspect of the disclosed technology.

FIG. 6 illustrates a repair automation flow for an FDIRCheck class. Each unique failure mode and its associated repair represents one instance of this flowchart. In this process, check may be performed on any component, subsystem or process of the satellite to identify any operational anomaly. Arbitrary correction may be performed based on the check result in order to keep the satellite operational.

Figure 7:
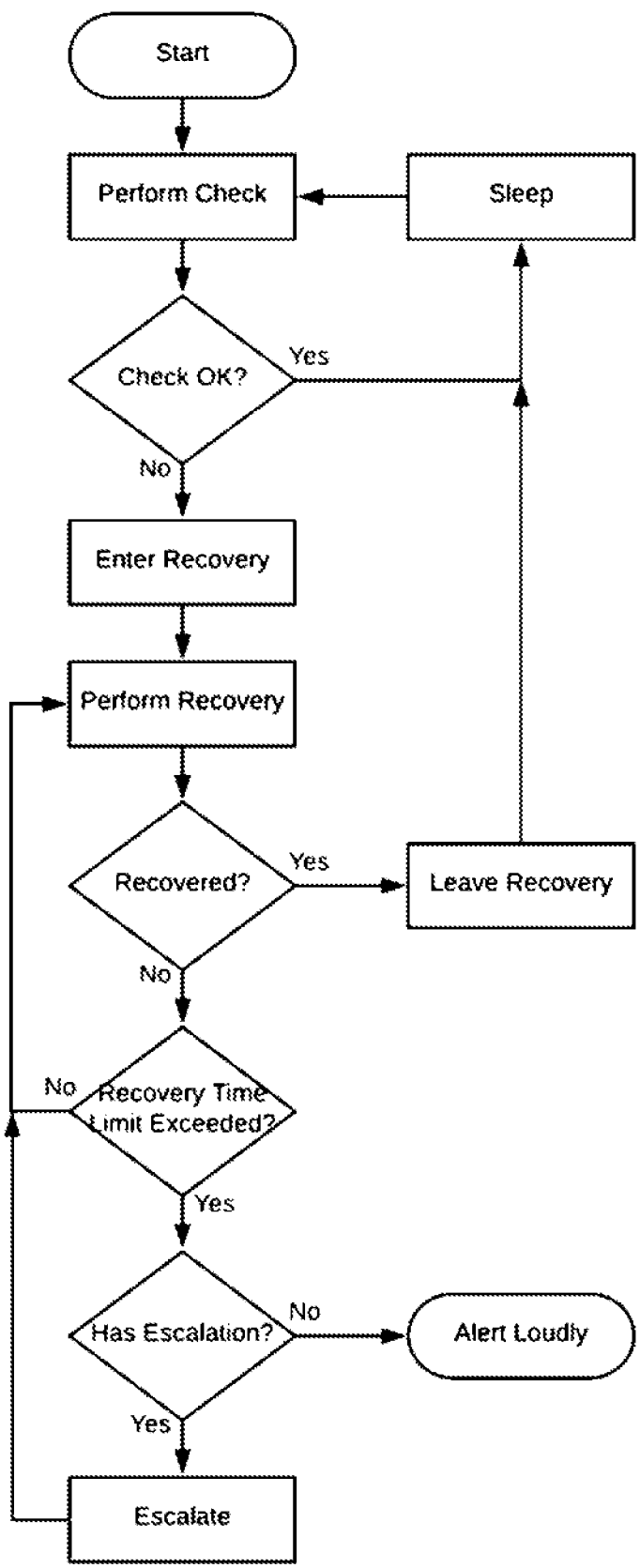
FIG. 7 is a flow diagram illustrating procedures of FDIR-EscalatingCheck according to one aspect of the disclosed technology.

FIG. 7 illustrates a repair automation flow for an FDIR-EscalatingCheck class.

The processors 312, 322, 332 and 342 may include one or more of a microprocessor, microcontroller, digital signal processor, co-processor or the like or combinations thereof capable of executing stored instructions and operating upon stored data. The processors 312, 322, 332 and 342 may be one or more known processing devices, such as a microprocessor from the Pentium™ family manufactured by Intel™ or the Turion™ family manufactured by AMD™. The processors 312, 322, 332 and 342 may constitute a single core or multiple core processor that executes parallel processes simultaneously. For example, the processors 312, 322, 332 and 342 may be a single core processor that is configured with virtual processing technologies. In certain embodiments, the processors 312, 322, 332 and 342 may use logical processors to simultaneously execute and control multiple processes. The processors 312, 322, 332 and 342 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory storage media 314, 324, 334 and 344 may contain an operating system ("OS") and a program. The non-transitory storage media 314, 324, 334 and 344 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory storage media 314, 324, 334 and 344. The non-transitory storage media 314, 324, 334 and 344 may include one or more memory devices that store data and instructions used to perform one or more features of the disclosed embodiments. The non-transitory storage media 314, 324, 334 and 344 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory storage media 314, 324, 334 and 344 may include software components that, when executed by the processors 312, 322, 332 and 342, perform one or more processes consistent with the disclosed embodiments. In some embodiments, the non-transitory storage media 314, 324, 334 and 344 may include a database to perform one or more of the processes and functionalities associated with the disclosed embodiments. The non-transitory storage media 314, 324, 334 and 344 may include one or more programs to perform one or more functions of the disclosed embodiments. Moreover, the processors 312, 322, 332 and 342 may execute one or more programs located remotely from the optimization system 300. For example, the optimization system 300 may access one or more remote programs, that, when executed, perform functions related to disclosed embodiments.

The optimization system 300 may also include one or more I/O devices that may comprise one or more interfaces for receiving signals or input from devices and providing signals or output to one or more devices that allow data to be received and/or transmitted by the optimization system 300. For example, the optimization system 300 may include interface components, which may provide interfaces to one or more input devices, such as one or more keyboards, mouse devices, touch screens, track pads, trackballs, scroll wheels, digital cameras, microphones, sensors, and the like, that enable the optimization system 300 to receive data from one or more users. The optimization system 300 may include a display, a screen, a touchpad, or the like for displaying images, videos, data, or other information. The I/O devices may include the graphical user interface.

In exemplary embodiments of the disclosed technology, the optimization system 300 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While certain implementations of the disclosed technology have been described in connection with what is presently considered to be the most practical and implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An optimization system for managing a constellation of satellites, comprising:
 a constellation configuration system including a first processor configured to:
  receive at least one mission objective defined by a user, and
  instruct one or more satellites to allocate one or more resources according to the mission objective;
 a constellation planning system including a second processor configured to:
  resolve contentions between and optimize usage of satellite and ground station resources at a constellation level;
  schedule uplink and downlink communications between the one or more satellites and a ground station; and
  schedule a cross-link communication between at least two satellites;
 a node planning system including a third processor configured to:
  determine whether a constellation plan is safe for an asset of the one or more satellites;
  autonomously in real time task the one or more satellites based on the constellation plan,
  send a command to the one or more satellites to execute the constellation plan when the constellation plan is safe; and
  perform intervention when the constellation plan is unsafe; and
 an asset profiling system including a fourth processor configured to:
  evaluate predicted performance of the optimization system optimized against observed performance.

2. The optimization system of claim 1, wherein the node planning system transmits an objective to the one or more satellites to be pursued locally, and wherein the node planning system tasks the one or more satellites by transmitting real time data including sensor values.

3. A constellation planning system, comprising:
 a processor configured to:
  receive a request, from a client, to create a planning task for one or more satellites in a constellation of satellites, the request including a planning problem object;
  generate a status of the planning task describing a progress of the planning task; and
  return the status to the client.

4. The constellation planning system of claim 3, wherein the processor is configured to determine whether the request is valid.

5. The constellation planning system of claim 3, wherein the processor is configured to:
 receive a request to return the status of the planning task.

6. The constellation planning system of claim 3, wherein the processor is configured to:
 receive a request to delete a planning task,
 halt planning of the task based on the received request.

7. The constellation planning system of claim 3, wherein the processor is configured to:
 generate an error response when the planning task encounters an error; and
 send the error response to the client.

8. The constellation planning system of claim 3, wherein the processor is configured to determine contact assignments between the satellites and a ground station based on a schedule of transits that each satellite passes over the ground station, and based on at least one of the following:
 a scheduled payload window; and
 historical telemetry that describes a pairwise bandwidth between the ground station and the satellites.

9. The constellation planning system of claim 3, wherein the processor is configured to perform semi-continuous splitting to:
 determine if a contact assignment between the one or more satellites and a ground station is to be scheduled; and
 determine time allocation for communications between the one or more satellites and the ground station.

10. The constellation planning system of claim 3, wherein the processor is configured to perform payload scheduling.

11. The constellation planning system of claim 3, wherein the processor is configured to:
 convert an area of interest into a set of coverage points,
 determine whether to execute a payload window when the one or more satellites passes over the area of interest,
 generate the payload window based on entrance and exit of the area of interest; and
 split the payload window when the payload window is greater than a maximum payload window.

12. The constellation planning system of claim 3, wherein when the status is successful, the processor is configured to transmit a resulting schedule to the client for publication to the constellation of satellites.

13. A node planning system, comprising:
 a processor configured to:
  task subsystems of a satellite in an optimal way;
  detect a failure on the satellite;
  perform repair on the satellite; and
  generate an alert notifying a user of the detected failure.

14. A method for planning tasks for a constellation of satellites, comprising:
 receiving a request, by a processor, from a client, to create a planning task for one or more satellites in a constellation of satellites, the request including a planning problem object;
 generating, by the processor, a status of the planning task describing a progress of the planning task; and returning, by the processor, the status of the client.

15. The method of claim 14, wherein when the status is successful, the processor is configured to transmit a resulting schedule to the client for publication to the constellation of satellites.

16. The method of claim 14, further comprising determining whether the request is valid.

17. The method of claim 14, further comprising:
receiving, by the processor, a request to delete a planning task;
halting, by the processor, planning of the task based on the received request.

18. The method of claim 14, further comprising:
generating, by the processor, an error response when the planning task encounters an error; and
sending, by the processor, the error response to the client.

19. The method of claim 14, further comprising
determining, by the processor, contact assignments between the satellites and the ground stations based on a schedule of transits that each satellite passes over each ground station, and based on at least one of the following:
a scheduled payload window; and
historical telemetry that describes a pairwise bandwidth between the ground station and the satellites.

20. The method of claim 14, further comprising:
performing, by the processor, semi-continuous splitting to:
determine if a contact assignment between the one or more satellites and a ground station is to be scheduled; and
determine time allocation for communications between the one or more satellites and the ground station.

21. The method of claim 14, further comprising:
performing, by the processor, payload scheduling.

22. The method of claim 14, further comprising:
converting, by the processor, an area of interest into a set of coverage points,
determining whether to execute a payload window when the one or more satellites passes over the area of interest,
generating the payload window based on entrance and exit of the area of interest; and
splitting the payload window when the payload window is greater than a maximum payload window.

* * * * *